(12) United States Patent
Fox et al.

(10) Patent No.: US 10,316,640 B2
(45) Date of Patent: Jun. 11, 2019

(54) SYSTEMS AND METHODS FOR PRESSURE TESTING WELL CONTROL EQUIPMENT

(71) Applicant: Nabors Drilling Technologies USA, Inc., Houston, TX (US)

(72) Inventors: Todd Fox, Cypress, TX (US); Joey Peyregne, Spring, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 180 days.

(21) Appl. No.: 15/402,829

(22) Filed: Jan. 10, 2017

(65) Prior Publication Data
US 2017/0204717 A1 Jul. 20, 2017

Related U.S. Application Data

(60) Provisional application No. 62/280,488, filed on Jan. 19, 2016.

(51) Int. Cl.
| | |
|---|---|
| *E21B 33/06* | (2006.01) |
| *E21B 47/00* | (2012.01) |
| *E21B 33/14* | (2006.01) |
| *G01M 3/28* | (2006.01) |
| *E21B 34/16* | (2006.01) |
| *E21B 47/06* | (2012.01) |
| *E21B 21/06* | (2006.01) |

(52) U.S. Cl.
CPC .............. *E21B 47/00* (2013.01); *E21B 33/06* (2013.01); *E21B 33/14* (2013.01); *E21B 34/16* (2013.01); *E21B 47/06* (2013.01); *G01M 3/2815* (2013.01); *G01M 3/2876* (2013.01); *E21B 21/065* (2013.01)

(58) Field of Classification Search
CPC .......... E21B 47/00; E21B 47/06; E21B 34/16; E21B 33/06; E21B 33/14; E21B 21/065; G01M 3/2876
See application file for complete search history.

(56) References Cited

U.S. PATENT DOCUMENTS

| | | | |
|---|---|---|---|
| 4,618,314 A | 10/1986 | Hailey | |
| 7,706,980 B2 | 4/2010 | Winters et al. | |
| 2012/0150455 A1 | 6/2012 | Franklin et al. | |
| 2012/0186873 A1 | 7/2012 | Shayegi et al. | |

(Continued)

FOREIGN PATENT DOCUMENTS

EP 1664478 B1 12/2006

OTHER PUBLICATIONS

International Search Report and Written Opinion for International Application No. PCT/US2017/013020, dated Apr. 27, 2017, 14 pgs.

(Continued)

*Primary Examiner* — Brad Harcourt
(74) *Attorney, Agent, or Firm* — Haynes and Boone, LLP

(57) ABSTRACT

Systems and methods of pressure testing well production equipment, such as a blowout preventer stack and a choke manifold are disclosed. The system may include a pressure testing tool disposed in selective fluid communication with the blowout preventer stack and the choke manifold and may be arranged to permit independent pressure testing of valves of the blowout preventer stack and valves of the choke manifold without breaking connections between the blowout preventer stack and the choke manifold.

20 Claims, 3 Drawing Sheets

(56) References Cited

U.S. PATENT DOCUMENTS

2012/0318529 A1 12/2012 Herrold et al.
2015/0292980 A1 10/2015 Veeningen et al.

OTHER PUBLICATIONS

International Preliminary Report on Patentability for International Application No. PCT/US2017/013020, dated Aug. 2, 2018, 13 pgs.

SYSTEMS AND METHODS FOR PRESSURE TESTING WELL CONTROL EQUIPMENT

PRIORITY

This application claims benefit of the filing date of U.S. Provisional Application No. 62/280,488, filed Jan. 19, 2016, which is incorporated in its entirety herein by reference.

TECHNICAL FIELD

This disclosure relates to the field of pressure testing well control equipment.

BACKGROUND OF THE DISCLOSURE

Exploration and production of petroleum, including oil and gas, requires the use of drilling rigs to drill wells deep in subterranean formations. These wells are expensive to both drill and operate. Accordingly, much effort has been put into making well drilling a more efficient process. As well drilling becomes more efficient, testing of well control equipment has not. Accordingly, the percentage of overall rig operating time that is spent on testing of well control has proportionally increased as the percentage of overall rig operating time spent on drilling has decreased. As such, efficiencies in testing processes may contribute to large gains in rig operating efficiencies.

Conventional processes for testing well control equipment require that technicians be present on location during the installation of a blowout preventer (BOP) stack in order to torque flange bolts and pressure test the connections to validate proper makeup. In some cases, certain components of well control equipment can be tested off-line; however, this requires non-rig personnel to work simultaneously to rig operations, which means higher labor costs.

Some government regulations require pressure testing of valves well control equipment at regular intervals. For example, regulations may require pressure testing every 14 days or whenever a connection is broken. As used herein, breaking connections is intended to mean separating coupled components. Conventional systems require breaking a connection in order to perform maintenance or any time a blowout preventer stack is moved to a new wellhead. Since a blowout preventer stack and a choke manifold each may include a plurality of individual valves and seals, pressure testing may be a time-consuming and tedious activity.

The present disclosure is directed to overcoming one or more of the deficiencies of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
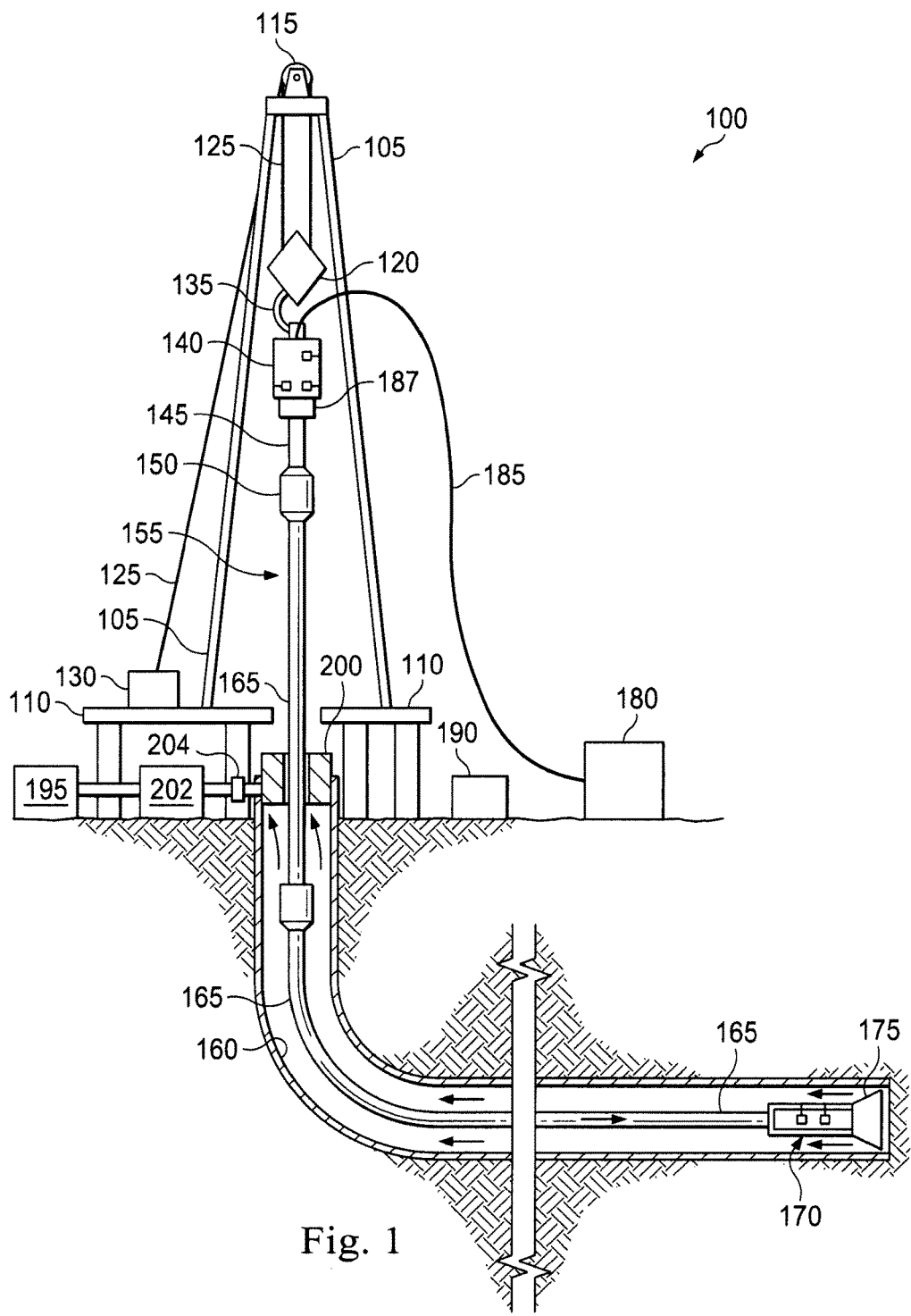
FIG. 1 is a plan view of an apparatus with a blowout preventer stack and a choke manifold according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The apparatuses and methods described in the present disclosure may increase the efficiency of non-drilling time by permitting pressure testing of well control equipment to occur in a more efficient manner. This may alleviate some need for personnel to install equipment and perform services. In turn, this decreases nonproductive time and costs. Furthermore, this may reduce exposure to safety risks to third-party personnel performing services. By reducing a need for non-rig personnel to be at the drill site installing equipment, risk of injury to these non-rig personnel may be decreased.

Referring to FIG. 1, illustrated is a schematic view of an apparatus 100 demonstrating one or more aspects of the present disclosure. The apparatus 100 in the example shown is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

The apparatus 100 includes a mast 105 supporting lifting gear above a rig floor 110. The drill floor 110 may be sized in a range of, e.g., about 35×35 feet, although larger and smaller rigs are contemplated. In some embodiments, the apparatus 100 may have a drill floor size of less than approximately 1600 square feet. In other embodiments, the apparatus 100 may have a drill floor size of less than approximately 1200 square feet. The drill floor 110 supports rig-based operations and rig equipment, including the mast 105.

The lifting gear supported above the rig floor 110 may include a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel out and reel in the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly. It should be understood that other conventional techniques for arranging a rig do not require a drilling line, and these are included in the scope of this disclosure.

The drill string 155 includes interconnected sections of drill pipe 165, a bottom hole assembly (BHA) 170, and a drill bit 175. The bottom hole assembly 170 may include stabilizers, drill collars, and/or measurement-while-drilling (MWD) or wireline conveyed instruments, among other components. The drill bit 175, which may also be referred to herein as a tool, is connected to the bottom of the BHA 170 or is otherwise attached to the drill string 155. One or more pumps 180 may deliver drilling fluid to the drill string 155 through a hose or other conduit 185, which may be fluidically and/or actually connected to the top drive 140. A washpipe system 187 may be disposed between the top drive 140 and the quill 145.

Still referring to FIG. 1, the top drive 140 is used to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

A blowout preventer stack 200, a choke manifold 202, and shakers 195 connect to the wellbore 160. These components are configured to receive well returns, including mud, cuttings, and gas, from the wellbore 160 and to remove the gas from the mud in a controlled manner from the wellbore 162. The shakers 195 separate solids from liquids by utilizing a vibrating system outfitted with specially designed and sized screens. The shakers 195 remove drilled solids and well cuttings returned from the wellbore during the drilling process. The flow of mud is represented by arrows shown the wellbore 160. Clean mud is pumped from the surface down through the drill string 165 as represented by the arrow within the drill string 165 adjacent the BHA 170. The mud then flows from the bottom of the wellbore 160 toward the surface, carrying cuttings and material, including gas, from the bottom of the wellbore 160. The mud, the cuttings, and any other material make the well returns. At the surface, the well returns are captured at the wellbore head and sent through the blowout preventer stack 200 to the choke manifold 202 and ultimately to the shakers 195.

A pressure testing tool 204 (Double Block and Bleed Device) is disposed between the blowout preventer stack 200 and the choke manifold 202. The pressure testing tool 204 enables pressure testing of the choke manifold while the blowout preventer is in use, while maintaining the ability to detect leaks for failure of the pressure test of the choke manifold and without the need to disconnect a fluid conduit, such as a choke hose or piping, from the BOP. The pressure testing tool 204 therefore provides advantages and efficiencies by reducing flat time/downtime, safety risks, and other inefficiencies while complying with governmental or maintenance requirements.

The apparatus 100 also includes a control system 190 configured to control or assist in the control of one or more components of the apparatus 100. For example, the control system 190 may be configured to transmit operational control signals to the drawworks 130, the top drive 140, the BHA 170 and/or the pump 180. The control system 190 may be a stand-alone component installed near the mast 105 and/or other components of the apparatus 100. In some embodiments, the control system 190 is physically displaced at a location separate and apart from the drilling rig.

Figure 2:
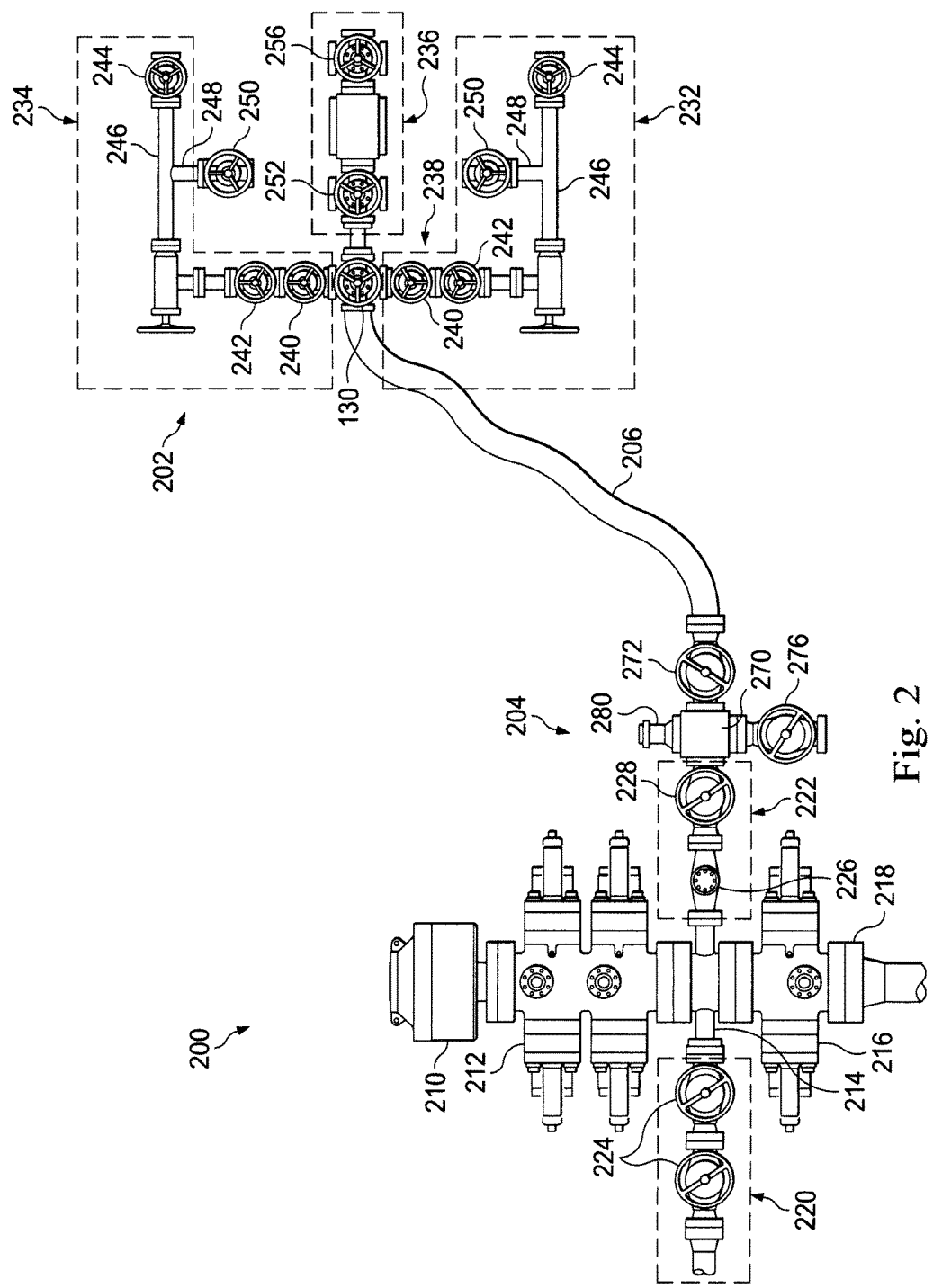
FIG. 2 is a plan view of an apparatus with a blowout preventer stack and a choke manifold connected by a pressure testing tool according to one or more aspects of the present disclosure.

FIG. 2 is an illustration of the blowout preventer stack 200, the choke manifold 202, the pressure testing tool 204 located therebetween, and a choke hose 206 connecting the choke manifold 202 to the pressure testing tool 204. The choke hose 206 may alternatively be hard piping or some other fluid carrier, all of which are collectively referred to as conduit. The blowout preventer stack 200 is a mechanical system used to seal, control, and monitor the gas well to prevent uncontrolled release of crude oil and/or natural gas from the well. The blowout preventer stack 200 may include an annular BOP 210, one or more double RAM BOP 212, drilling spool or mud cross 214, and one or more single RAM BOP 216. The single RAM BOP 216 is connected to a test stump 218. The well head is the surface valve assembly that provides access to the well bore. A test stump may also be used in lieu of the well head 218 and is simply a support or sturdy foundation upon which the blowout preventer stack 200 rests during pressure testing operations. Wing valves 220, 222 extend from opposing sides of the mud cross 214. The wing valves 220, 222 include one or more manual gate valves and or hydraulic valves to control flow to a wellbore through the blowout preventer stack 200. In this implementation, the wing valve 220 includes two manual gate valves 224 aligned in series and connected to the mud cross 214. The wing valve 222 includes a hydraulic gate valve 226 and a single manual BOP gate valve 228. Other implementations include manual and hydraulic gate valves arranged in different orders and in different numbers. For example, in some implementations, one or both of the wing valves 220, 222 include only a single gate valve. Other valve arrangements are also contemplated. Furthermore, the blowout preventer 200 may be formed of any number of stacked BOPs. For example, in some implementations only RAM style BOPs are employed. In other implementations, only annular BOPs are employed.

The choke manifold 202 is structurally arranged to circulate influx of fluid and gas from the blowout preventer stack 200 to the shakers 195 (FIG. 1), mud gas separator, flare line, or panic line at the drill site. In some exemplary implementations, the choke manifold 202 may be disposed remotely from the blowout preventer stack 200 and may be disposed at other areas on the rig. In the exemplary embodiment disclosed, the choke manifold 202 includes a main four-way manifold valve 230 and three choke lines made up of a primary choke 232, a backup choke 234, and an emergency choke 236. Each of these chokes lines connect to and extend from the main four-way manifold valve 230. In the exemplary implementation shown, the primary choke 232 and the backup choke 234 are mirror images of each other in construction. However in other implementations, the primary choke 232 and the backup choke 234 vary from one another, with one or the other having a greater number or lesser number of valves. Other configurations of valves are also contemplated.

The primary choke 232 comprises a series of valves 238. In this exemplary implementation, the primary choke 232 includes a valve 240, a valve 242, and a valve 244 along its main line 246. A branch line 248 includes a valve 250. The valves 244, 250 lead to the shaker tanks. The valve 242 provides redundancy to the valve 238. In other implementations, the primary choke 232 includes a fewer number or greater number of valves. In some implementations, the valves are not used in a redundant manner. As indicated above, the primary choke 232 and the backup choke 234 are mirror images in this exemplary implementation. Accordingly, the backup choke 234 also has a mainline 246 and a branch line 248. These respectively include valves 240, 242, 244 and valve 250. The emergency choke 236 extends directly from the manifold valve 230. In this exemplary embodiment, it includes two additional valves 252, and 256. The emergency choke 236 is arranged to provide immediate pressure relief to the choke manifold 202 and to the blowout preventer stack 200 through the choke hose 206. Accordingly, the emergency choke 236 includes a portion with a larger diameter than might be found on the primary choke 232 and the backup choke 234. This allows more immediate expansion of compressed gas during an emergency scenario.

The pressure testing tool 204 may comprise a high pressure cross or high pressure "T" including a body 270 having a fluid passage therethrough and a plurality of valves. The fluid passage may connect all the valves and may be sized and configured to be used during regular operation to pass mud, oil, and gas from the blowout preventer stack 200 to the choke manifold 202. In an exemplary implementation, the body 270 and valves may be arranged in a double block and bleed configuration. In the exemplary embodiment shown, the body 270 is a four-way stud block. However, other implementations employ a three way stud block or other arrangement. The plurality of valves of the pressure testing tool 204 includes the manual BOP gate valve 228 of the wing valve 222, and includes a choke valve 272 and a test valve 276. The choke valve 272 and the test valve 276 may be manual gate valves formed in the same manner as the BOP gate valve 228. The pressure testing tool 204 is arranged so that the BOP gate valve 228 connects the pressure testing tool to the blowout preventer stack 200, and the gate valve 272 connects the pressure testing tool to the choke hose 206. In this implementation, the choke valve 272 and the manual BOP gate valve 228 are on opposing sides of the body 270. This permits fluid flow through the main body from the blowout preventer stack 200 to the choke hose 206 with a minimal amount of fluid disruption.

The test valve 276 is configured and arranged to open to the atmosphere either directly or via open ended piping or an open ended hose connection. In some implementations, a hose or pipe may extend from the test valve 276, but the resistance of these will be minimized. The test valve 276 may closed during standard operating procedures where pressurized oil and gas flow from the blowout preventer stack 200 to the choke manifold 202. However, during pressure testing of valves in the blowout preventer stack 200 or the choke manifold 202, the test valve 276 may be opened to permit any leaking fluid to flow where it may be visible to an operator.

Opposite the test valve 276, this implementation includes an optional two-inch adapter 280 attached to the body 270. In some implementations, the adapter 280 is simply a plug for the fourth side of the body 270 of the pressure testing tool 204. Accordingly, in some implementations the adapter 280 simply prevents fluid from escaping the body 270 in any circumstance. In other implementations, the adapter 280 may be may be connected to other components, such as an additional hose or component that may be used to detect fluid pressure or collect other information relating to fluid in or fluid draining from the body 270. In some implementations, the adapter may connect with or may be replaced by pressure measuring components such as, for example, a pressure gauge, a pressure recording device, or other pressure detecting systems. In some implementations, the fluid passage through the testing tool 204 may include one or more additional optional ports that may be used for example to monitor pressure or other parameters. For example, the optional port may include a pressure gauge, pressure recording device, or other optional pressure measuring apparatus. In some arrangements, the test valve is arranged to allow venting from the fluid passage to the atmosphere and to allow visual observation of fluid escaping from the fluid passage. In some arrangements, a pressure measuring indicator, such as, for example, a pressure gauge, a pressure recording device, or other pressuring measuring apparatus is disposed downstream of the test valve and is arranged to measure pressure downstream of the test valve 276. Accordingly, the test valve 276 may selectively isolate the pressure measuring apparatus from the fluid passage through the pressure testing tool 204.

Although the pressure testing tool 204 is described as a four-way stud block for the body 270, other implementations use a three-way stud block. In such implementations, the body may be T-shaped. Other arrangements are also contemplated.

The choke hose 206 extends between and connects to the choke manifold 202 and the pressure testing tool 204. The choke hose 206 may be any hose suitable for carrying high-pressure fluids and gas from the blowout preventer stack 200 to the choke manifold 204. In the implementation shown, the choke hose 206 is formed of a flexible material. Accordingly, the choke hose 206 may be twisted, turned, or bent as it is manipulated to connect to the choke manifold 202 and the pressure testing tool 204. As indicated above, in some embodiments, the choke hose is a hard pipe connection.

As indicated in the background section above, government regulations require frequent pressure testing of all valves in a blowout preventer stack 200 and a choke manifold. For example, some government regulations require pressure testing of all valves at least every 21 days; others require pressure testing of all valves at least every 14 days. In addition, any time a seal is broken, additional pressure testing must take place. As such, pressure testing often occurs any time a rig is moved to a new well, even if on the same drilling pad. This type of maintenance may occur at the expense of valuable operation time for a drilling rig. However using the pressure testing tool 204 to isolate the blowout preventer stack 200 from the choke manifold 204 while opening the component under pressure testing to atmospheric pressure may speed the pressure testing process. This in turn results in less downtime and increased productivity for the well drilling equipment.

Figure 3:
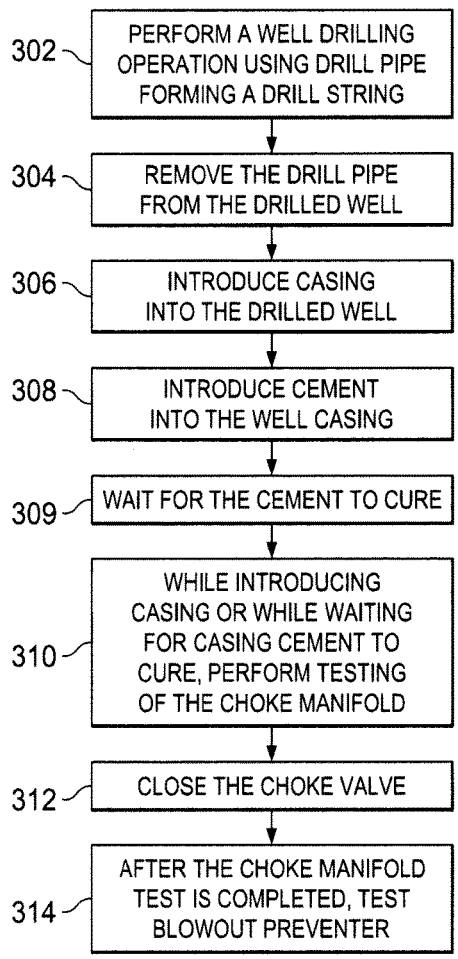
FIG. 3 is a flow-chart diagram of at least a portion of a method of operating a well according to one or more aspects of the present disclosure.

An exemplary implementation of use is explained with reference to FIGS. 3-5. Referring first to FIG. 3, the method begins at 302 by performing a well drilling operation using drill pipe forming a drill string. The well drilling operation may be performed in manners known in the art using known drilling methods. In some implementations this may include drilling with a top drive apparatus.

At 304, the drill string may be removed from the well. This may include tripping/removing tubulars of the drill string out of the well and stacking or setting back the tubulars for use in another well. At 306, operators may begin introducing casing into the drilled well using methods known in the art. After casing is inserted into the well bore, at 308 operators may introduce cement into the well bore about the casing to secure the casing to the well bore. At 309, operators may wait for a period of time for the casing cement to cure.

At 310, while introducing the casing or while waiting for the casing cement to cure, operators may use the pressure testing tool 204 to pressure test the choke manifold 202. Since pressure testing occurs simultaneously with introducing casing or waiting for casing cement to cure, efficiencies may be realized. Testing the choke manifold 202 may be accomplished using the pressure testing tool 204. In some implementations, the pressure testing tool 204 is a double block and bleed arrangement permitting the choke manifold 202 to remain connected to the blowout preventer stack 200 during both pressure testing and during regular operation where pressurized fluid and gas may flow from the blowout preventer 200 to the choke manifold 202. Exemplary steps for pressure testing the choke manifold are shown in FIG. 4.

Figure 4:
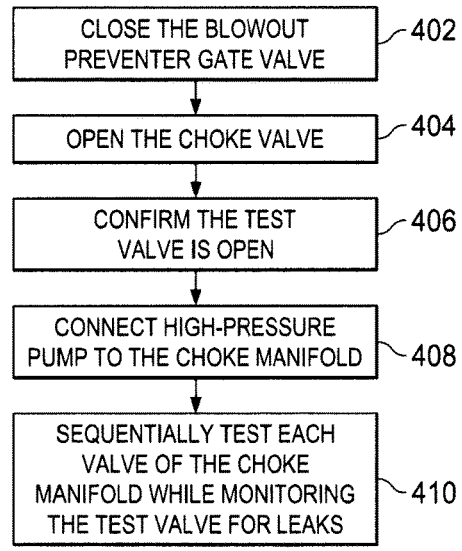
FIG. 4 is a flow-chart diagram of at least a portion of a method of pressure testing a well component according to one or more aspects of the present disclosure
Figure 5:
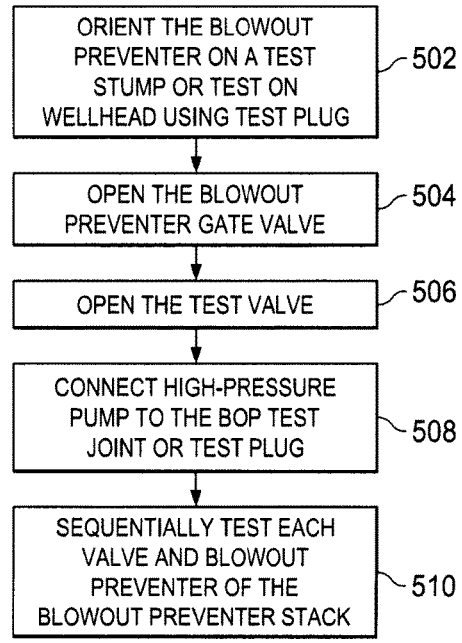
FIG. 5 is a flow-chart diagram of at least a portion of a method of pressure testing the well component according to one or more aspects of the present disclosure.

With reference to FIG. 4, pressure testing of the choke manifold 202 occurs by closing the blowout preventer gate valve 228. Although described as a gate valve, it should be recognized that the gate valve 228 is representative of any valve separating pressure from the choke manifold and the blowout preventer stack. This may isolate the choke manifold 202 from the blowout preventer stack 200. Accordingly, because of the closed blowout preventer gate valve, fluid used to test the choke manifold is unable to enter the blowout preventer stack 200. With the blowout preventer gate valve 228 closed, the choke valve 272 may be opened as indicated at 404. At 406, the operator may open the test valve 276, thereby exposing the choke hose and/or the choke manifold to the atmosphere. At 408, a high-pressure pump may be connected to the choke manifold. In some instances, the high-pressure pump is rated to provide pressurized fluid in a range between 5000 psi and 15,000 psi. In some instances, the high-pressure pump is rated to provide pressurized fluid in the range of 5000 psi to 10,000 psi. At 410, each valve of the choke manifold may be tested for leaks. As indicated above, leaks may be discovered when fluid flows from the test valve 276 or when constant pressure is not confirmed during the pressure test. Pressure testing may occur in a sequential manner for each valve of the choke manifold. If fluid passes through the valve being tested, the fluid will appear through the test valve 276, indicating a malfunctioning valve. The valve must then be repaired or replaced. If fluid is unable to pass through the valve being tested, which is indicated by a lack of fluid flowing from the test valve 276 as well as a constant pressure reading during the test, then the valve is considered to be suitable for additional operation. In some implementations, pressure testing the choke manifold may take longer than the time required to insert casing or wait for cement to cure. In other implementations, pressure testing the choke manifold may take less time than the time required to insert casing or wait for cement to cure.

The process then returns to FIG. 3, and the operator may close the choke valve 272 at 312. At 314, after the choke manifold test is complete, an operator may next pressure test the blowout preventer stack 200.

The process of pressure testing the blowout preventer stack 200 is described with reference to FIG. 5. The process begins at 502 by orienting the blowout preventer stack 200 on a test stump such as the test stump 218 or if the BOP is attached to a well head, inserting a test plug.

At 504, the operator may close the blowout preventer gate valve 228, thereby placing the blowout preventer stack 200 in communication with the pressure testing tool 204. It should be recognized that the blowout preventer gate valve 228 is representative of any valve separating pressure from the blowout preventer stack from the pressure testing tool 204. For example, in some implementations the positions of the BOP gate valve 228 and the hydraulic valve 226 may be switched. To test the blowout preventer stack 200, and to avoid the chance that pressurized fluid may flow across the pressure testing tool 204 to the choke hose 206 and the choke manifold 202, the choke valve 272 also may be closed, if not done previously, such as at 312 in FIG. 3. Closing the choke valve 272 may isolate the choke manifold 202 from the blowout preventer stack 200.

At 506, an operator may open the test valve 276, if not already open. This enables leak detection during testing of the blowout preventer stack 200. Pressure testing may occur at 508 by connecting a high-pressure pump to the blowout preventer stack 200 to test each individual valve and seal of the blowout preventer stack 200. In some implementations, the high-pressure pump is connected to the wing valve 220 of the blowout preventer stack 200.

At 510, each valve and blowout preventer of the blowout preventer stack 200 is individually tested. This is done by opening all valves except the valve to be tested. As indicated previously, if fluid passes through the valve being tested, the fluid will appear through the test valve 276, indicating a malfunctioning valve. The valve must then be repaired or replaced. If fluid is unable to pass through the valve being tested, which is indicated by a lack of fluid flowing from the test valve 276 as well as a constant pressure reading during the test, then the valve is considered to be suitable for additional operation.

Provided that all valves and seals are suitable for operation, the blowout preventer stack 200 and the choke manifold 202 are then ready to use. Because the pressure testing tool 204 is disposed between the blowout preventer stack and the choke manifold, each of the blowout preventer stack and the choke manifold may be independently tested without breaking any connections. This is different than what has been done in the past, where pressure testing of the blowout preventer stack or the choke manifold required breaking connections between them or by waiting for all drilling activity to cease prior to conducting pressure tests on either component.

The systems and methods described herein may provide a more effective use of time by permitting compliance pressure testing of a blowout preventer stack and a choke manifold during periods of time that they are typically not being utilized. Because the pressure testing tool 204 permits pressure testing without breaking a connection, pressure testing may occur while drilling, while placing casing, or while waiting for cement to cure. Accordingly, advantages in efficiency and well readiness may be more easily obtained.

In view of all of the above and the figures, one of ordinary skill in the art will readily recognize that the present disclosure introduces a well production system that may include a blowout preventer stack (BOP) configured to be positioned on a wellhead or a test stump. The blowout preventer stack may include a blowout preventer valve through which pressurized fluid and gas can exit a well; a choke manifold comprising a plurality of fluid lines through which the pressurized fluid and gas may flow, the choke manifold comprising a plurality of valves selectively controllable to permit or prevent the pressurized fluid and gas from passing through the manifold; a choke conduit extending from and in fluid communication with the choke manifold, the choke conduit being arranged to carry the pressurized fluid and gas to the choke manifold; and a pressure testing tool disposed in selective fluid communication with the blowout preventer stack and the choke conduit and being arranged to permit independent pressure testing of valves of the blowout preventer stack and valves of the choke manifold without breaking connections between the blowout preventer stack and the choke manifold and without the need to add additional valves to the system if connections are disconnected. The pressure testing tool may include a fluid passage sized and configured to carry pressurized fluid and gas from the blowout preventer stack to the choke conduit when the well production system is an operational use; a blowout preventer valve disposed between the fluid passage and the blowout preventer stack, the blowout preventer valve being operable to selectively place the blowout preventer stack in fluid communication with the passage, a choke manifold valve disposed between the fluid passage and the choke conduit, the choke manifold valve being operable to selectively place the choke conduit in fluid communication with the passage; and a test valve disposed between the fluid passage and the atmosphere, the test valve being operable to selectively open the fluid passage to one of the atmosphere and to a pressure measuring indicator.

In some aspects, the pressure testing tool is a double block and bleed piping arrangement. In some aspects, the pressure testing tool is a high-pressure cross. In some aspects, the pressure testing tool comprises a T-shaped body. In some aspects, the well production system may comprise a pressure measuring indicator disposed downstream of the test valve. In some aspects, the test valve is arranged to allow venting from the fluid passage to the atmosphere and to allow visual observation of fluid escaping from the fluid passage. In some aspects, the choke manifold comprises a primary choke, a secondary choke, and an emergency choke. In some aspects, the primary choke and secondary choke have the same structure.

The present disclosure also introduces a well production system that may include a blowout preventer stack (BOP) configured to be positioned on a wellhead or a test stump, the blowout preventer stack comprising a blowout preventer valve through which pressurized fluid and gas can exit the well; a choke manifold comprising a plurality of fluid lines through which the pressurized fluid and gas may flow, the choke manifold comprising a plurality of valves selectively controllable to permit or prevent the pressurized fluid and gas from passing through the manifold; a choke conduit extending from and in fluid communication with the choke manifold, the choke conduit being arranged to carry the pressurized fluid and gas to the choke manifold; a double block and bleed piping arrangement disposed in selective fluid communication with the blowout preventer stack and the choke conduit and being arranged to permit independent pressure testing of valves of the blowout preventer stack and valves of the choke manifold without breaking connections between the blowout preventer stack and the choke manifold.

In some aspects, the double block and bleed piping arrangement comprises: a fluid passage sized and configured to carry pressurized fluid and gas from the blowout preventer stack to the choke conduit when the well production system is an operational use; a blowout preventer valve disposed between the fluid passage and the blowout preventer stack, the blowout preventer valve being operable to selectively place the blowout preventer stack in fluid communication with the passage, a choke manifold valve disposed between the fluid passage and the choke conduit, the choke manifold valve being operable to selectively place the choke conduit in fluid communication with the passage, and an atmospheric valve disposed between the fluid passage and the atmosphere, the atmospheric valve being operable to selectively open the fluid passage to the atmosphere. In some aspects, the pressure testing tool is a high-pressure cross. In some aspects, the pressure testing tool comprises a T-shaped body. In some aspects, the test valve is arranged to allow venting from the fluid passage to the atmosphere and to allow visual observation of fluid escaping from the fluid passage.

The present disclosure also introduces methods for pressure testing and operating a blowout preventer stack and a choke manifold comprising: drilling a well; fluidically isolating a blowout preventer stack from a choke manifold with a pressure testing tool; while drilling the well, pressure testing a blowout preventer stack for leaks without breaking a connection between the blowout preventer stack and a choke manifold; introducing casing to the drilled well and cementing the casing in the drilled well; while introducing casing or while the cement cures, pressure testing the choke manifold for leaks without breaking a connection between the blowout preventer stack and the choke manifold; and producing from the well and directing pressurized fluid and gas through the blowout preventer stack, through the pressure testing tool, and through the choke manifold.

In some aspects, method includes opening a test valve to place a fluid passage through the pressure testing tool in communication with the atmosphere. In some aspects, fluidically isolating the blowout preventer stack from the choke manifold comprises closing a choke valve of the pressure testing tool and opening a gate valve of the pressure testing tool. In some aspects, the pressure testing tool comprises a fluid passage linearly extending between the gate valve of the pressure testing tool and the choke valve of the pressure testing tool. In some aspects, method includes fluidically isolating the blowout preventer stack from the choke manifold by closing a gate valve of the pressure testing tool and opening a choke valve of the pressure testing tool. In some aspects, pressure testing the blowout preventer stack for leaks comprises individually pressure testing valves associated with the blowout preventer stack. In some aspects, pressure testing the choke manifold for leaks comprises individually pressure testing valves associated with the choke manifold.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

We claim:
1. A well production system comprising:
a blowout preventer stack (BOP) configured to be positioned on a wellhead or a test stump, the blowout preventer stack comprising a blowout preventer valve through which pressurized fluid and gas can exit a well;
a choke manifold comprising a plurality of fluid lines through which the pressurized fluid and gas may flow, the choke manifold comprising a plurality of valves selectively controllable to permit or prevent the pressurized fluid and gas from passing through the manifold;
a choke conduit extending from and in fluid communication with the choke manifold, the choke conduit being arranged to carry the pressurized fluid and gas to the choke manifold; and
a pressure testing tool disposed in selective fluid communication with the blowout preventer stack and the choke conduit and being arranged to permit independent pressure testing of valves of the blowout preventer stack and valves of the choke manifold without breaking connections between the blowout preventer stack and the choke manifold and without the need to add additional valves to the system if connections are disconnected, the pressure testing tool comprising:
a fluid passage sized and configured to carry pressurized fluid and gas from the blowout preventer stack to the choke conduit when the well production system is an operational use;
a blowout preventer valve disposed between the fluid passage and the blowout preventer stack, the blowout preventer valve being operable to selectively place the blowout preventer stack in fluid communication with the passage,
a choke manifold valve disposed between the fluid passage and the choke manifold, the choke manifold valve being operable to selectively place the choke conduit in fluid communication with the passage; and
a test valve disposed between the fluid passage and an atmosphere, the test valve being operable to selectively open the fluid passage to one of the atmosphere and to a pressure measuring indicator.

2. The well production system of claim 1, wherein the pressure testing tool is a double block and bleed piping arrangement.

3. The well production system of claim 1, wherein the pressure testing tool is a high-pressure cross.

4. The well production system of claim 1, wherein the pressure testing tool comprises a T-shaped body.

5. The well production system of claim 1, further comprising a pressure measuring indicator disposed between the choke manifold and the test valve.

6. The well production system of claim 1, wherein the test valve is arranged to allow venting from the fluid passage to the atmosphere and to allow visual observation of fluid escaping from the fluid passage.

7. The well production system of claim 1, wherein the choke manifold comprises a primary choke, a secondary choke, and an emergency choke.

8. The well production system of claim 1, wherein the primary choke and secondary choke have the same structure.

9. A well production system comprising:
a blowout preventer stack (BOP) configured to be positioned on a wellhead or a test stump, the blowout preventer stack comprising a blowout preventer valve through which pressurized fluid and gas can exit the well;
a choke manifold comprising a plurality of fluid lines through which the pressurized fluid and gas may flow, the choke manifold comprising a plurality of valves selectively controllable to permit or prevent the pressurized fluid and gas from passing through the manifold;
a choke conduit extending from and in fluid communication with the choke manifold, the choke conduit being arranged to carry the pressurized fluid and gas to the choke manifold;
a double block and bleed piping arrangement disposed in selective fluid communication with the blowout preventer stack and the choke conduit and being arranged to permit independent pressure testing of valves of the blowout preventer stack and valves of the choke manifold without breaking connections between the blowout preventer stack and the choke manifold.

10. The well production system of claim 9, wherein the double block and bleed piping arrangement comprises:
a fluid passage sized and configured to carry pressurized fluid and gas from the blowout preventer stack to the choke conduit when the well production system is an operational use;
a blowout preventer valve disposed between the fluid passage and the blowout preventer stack, the blowout preventer valve being operable to selectively place the blowout preventer stack in fluid communication with the passage,
a choke manifold valve disposed between the fluid passage and the choke conduit, the choke manifold valve being operable to selectively place the choke conduit in fluid communication with the passage, and
an atmospheric valve disposed between the fluid passage and an atmosphere, the atmospheric valve being operable to selectively open the fluid passage to the atmosphere.

11. The well production system of claim 9, wherein the pressure testing tool is a high-pressure cross.

12. The well production system of claim 9, wherein the pressure testing tool comprises a T-shaped body.

13. The well production system of claim 9, wherein the test valve is arranged to allow venting from the fluid passage to an atmosphere and to allow visual observation of fluid escaping from the fluid passage.

14. A method for pressure testing and operating a blowout preventer stack and a choke manifold comprising:
drilling a well;
fluidically isolating a blowout preventer stack from a choke manifold with a pressure testing tool;
while drilling the well, pressure testing a blowout preventer stack for leaks without breaking a connection between the blowout preventer stack and a choke manifold;
introducing casing to the drilled well and cementing the casing in the drilled well;
while introducing casing or while the cement cures, pressure testing the choke manifold for leaks without breaking a connection between the blowout preventer stack and the choke manifold;
producing from the well and directing pressurized fluid and gas through the blowout preventer stack, through the pressure testing tool, and through the choke manifold.

15. The method of claim 14, comprising: opening a test valve to place a fluid passage through the pressure testing tool in communication with an atmosphere.

16. The method of claim 14, wherein fluidically isolating the blowout preventer stack from the choke manifold comprises closing a choke valve of the pressure testing tool and opening a gate valve of the pressure testing tool.

17. The method of claim 16, wherein the pressure testing tool comprises a fluid passage linearly extending between the gate valve of the pressure testing tool and the choke valve of the pressure testing tool.

18. The method of claim 14 comprising fluidically isolating the blowout preventer stack from the choke manifold by closing a gate valve of the pressure testing tool and opening a choke valve of the pressure testing tool.

19. The method of claim 14 wherein pressure testing the blowout preventer stack for leaks comprises individually pressure testing valves associated with the blowout preventer stack.

20. The method of claim 14, wherein pressure testing the choke manifold for leaks comprises individually pressure testing valves associated with the choke manifold.

* * * * *